United States Patent [19]

Wentzel

[11] Patent Number: 4,643,239
[45] Date of Patent: Feb. 17, 1987

[54] OVERHEAD SECTIONAL DOORS

[75] Inventor: Harold G. Wentzel, Elkhart, Ind.

[73] Assignee: Uneek Cap and Door, Inc., Elkhart, Ind.

[21] Appl. No.: 672,629

[22] Filed: Nov. 19, 1984

[51] Int. Cl.⁴ ............................................. E05D 15/00
[52] U.S. Cl. ...................................... 160/201; 160/209; 49/484; 49/485; 49/197
[58] Field of Search .................................. 49/197–200, 49/477, 493, 485, 484; 160/201, 202, 209, 40

[56] References Cited

U.S. PATENT DOCUMENTS

| | | | |
|---|---|---|---|
| 2,862,256 | 12/1958 | Stroup | 160/40 X |
| 2,994,555 | 8/1961 | McClure | 49/493 X |
| 3,086,258 | 4/1963 | Fuller | 49/485 X |
| 3,126,049 | 3/1964 | Hollands | 160/40 |
| 3,129,752 | 4/1964 | Whiting | 160/201 |
| 3,140,517 | 7/1964 | Richter | 49/498 X |
| 3,148,724 | 9/1964 | Chieger et al. | 160/201 X |
| 3,334,681 | 8/1967 | Crosswell | 160/40 |
| 3,339,619 | 9/1967 | Crosswell | 160/40 |
| 3,506,088 | 4/1970 | Sherman | 160/40 X |
| 4,250,941 | 2/1981 | McNally | 160/209 |

FOREIGN PATENT DOCUMENTS 318364  12/1956  Switzerland ..................... 160/209

Primary Examiner—Peter A. Aschenbrenner
Attorney, Agent, or Firm—Gordon W. Hueschen

[57] ABSTRACT

There is disclosed an overhead sectional door suitable for use with capped pickup trucks in which a multiplicity of sealing means are provided. Thus, there is provided compressible sealing means adapted to be compressed against the outer and inner faces of the door and auxiliary flexible sealing member adapted to span the compressible sealing member at the face of the door and from the side of the doorway to the door, a special sill plate having an upturned inner edge adapted to act as a dam and a transverse compressible sealing member adapted to seal between the door and the upturned member. A special fixed base support bracket is provided to hold a compressible sealing member in position to be compressed against the inner face of the door.

7 Claims, 8 Drawing Figures

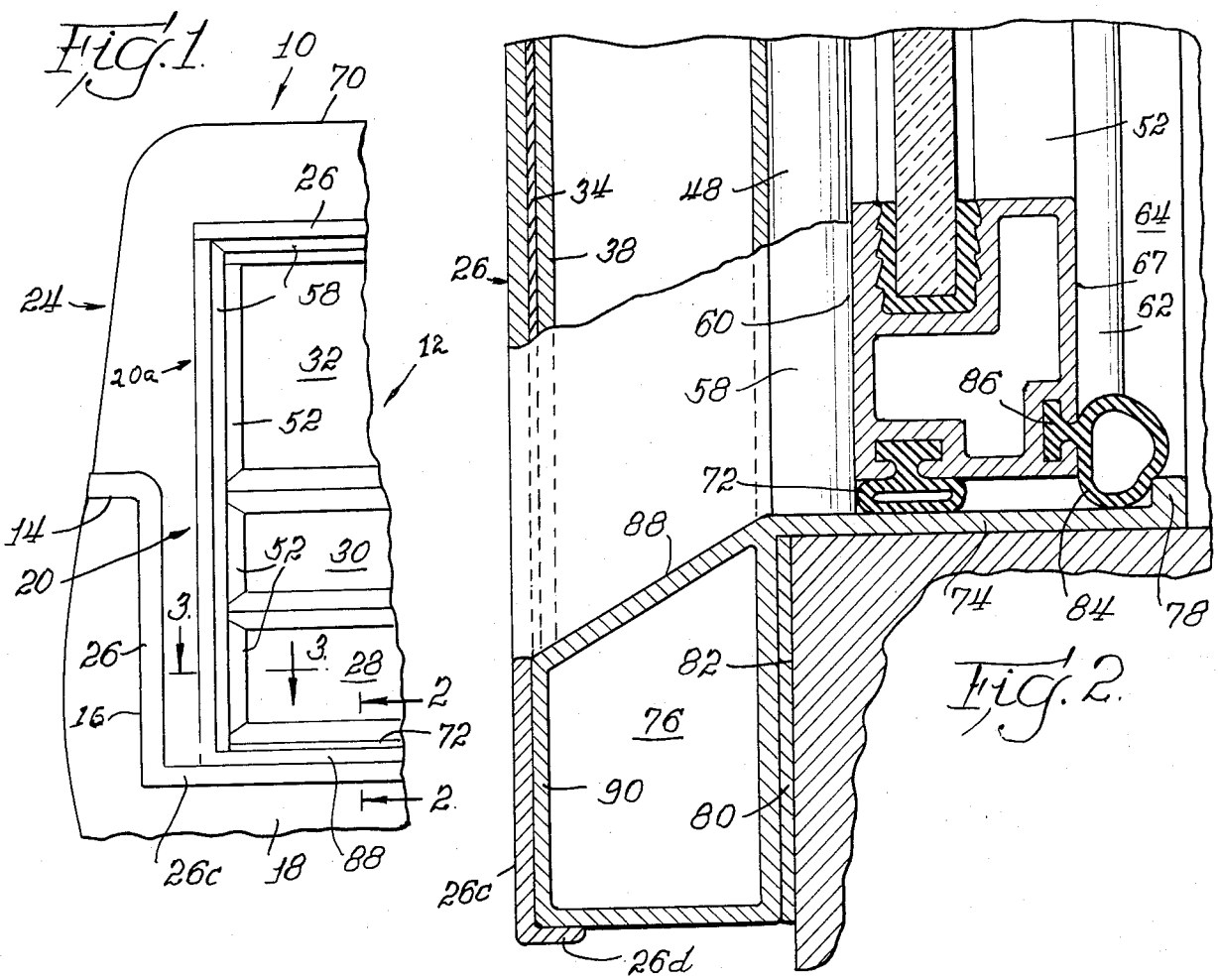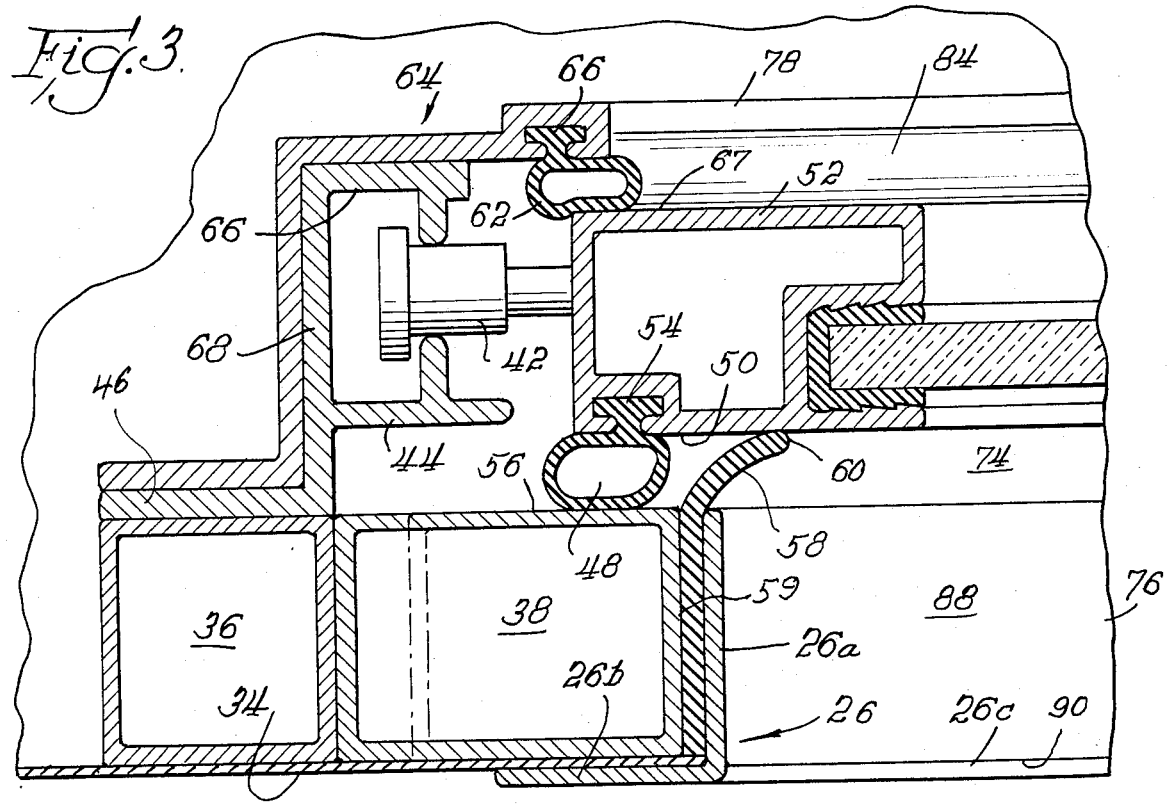

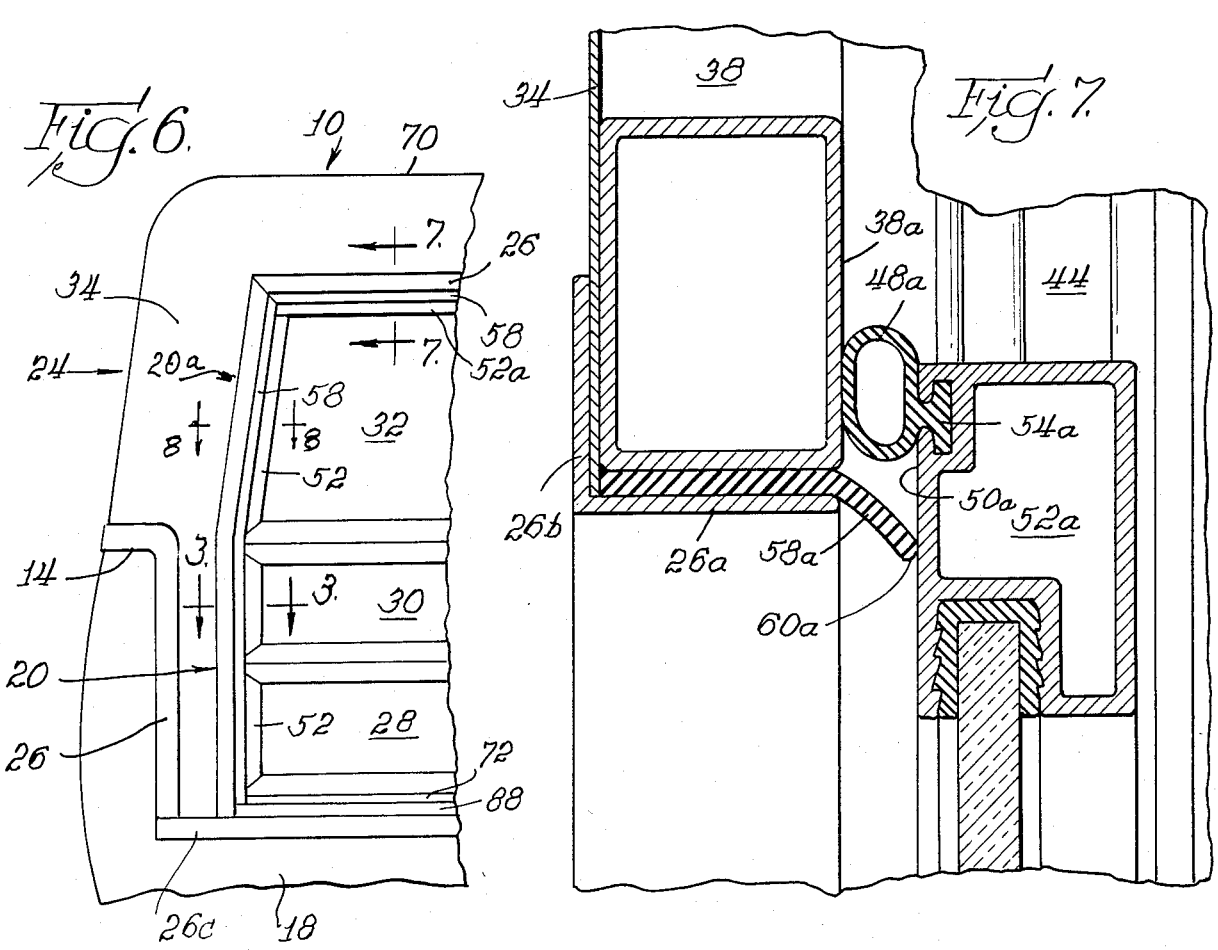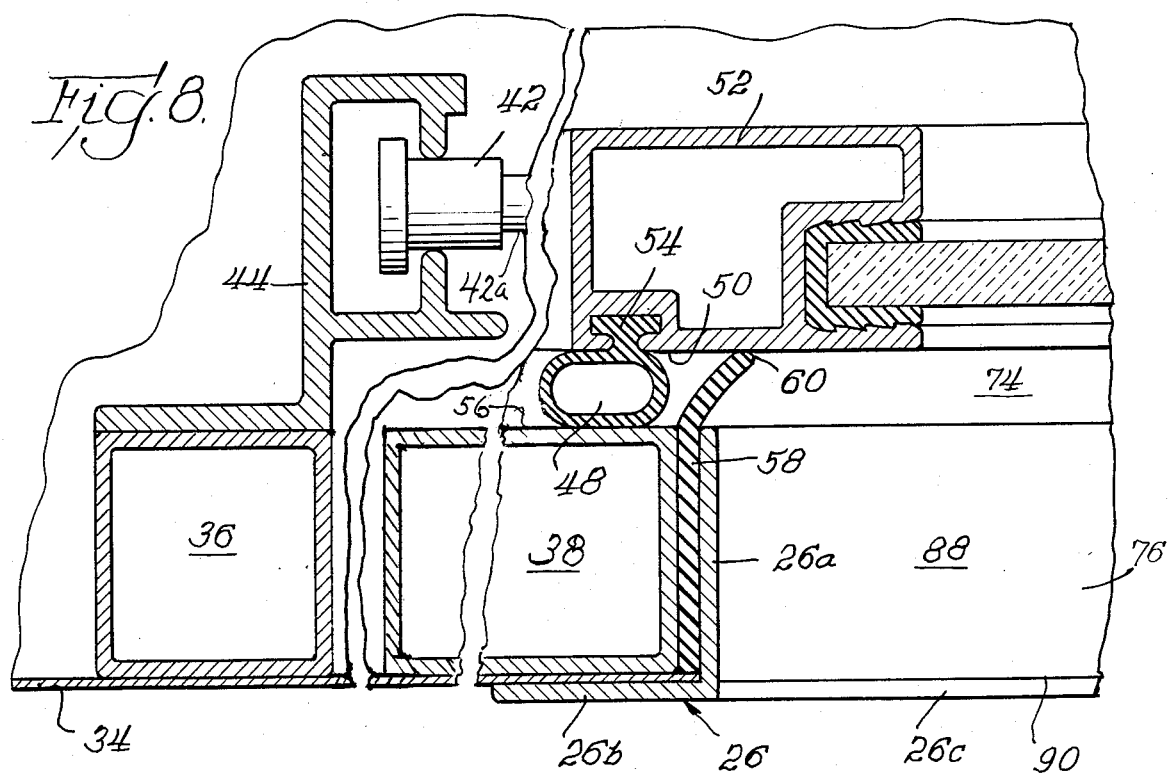

OVERHEAD SECTIONAL DOORS

BACKGROUND OF THE INVENTION

The invention relates to improvements in overhead sectional doors particularly adapted for use in caps for pickup trucks.

FIELD OF THE INVENTION AND PRIOR ART

Overhead doors are commonly used as closures for garages and the like buildings and for vans and like motor vehicles. Efforts heretofore directed to adaptation of such overhead doors for caps for light pickup trucks has run into difficulties because of the peculiar requirements of such an environment.

My copending applications, Ser. Nos. 489,582; 538,165; and 616,853, filed Apr. 28, 1983; Oct. 3, 1983; and June 4, 1984, respectively, are directed to the solution of some of these peculiar problems and the present invention is directed to improvements in caps for pickup trucks of the character disclosed in these applications.

SUMMARY OF THE INVENTION

The invention relates to improvements in an overhead sectional door characterized by a doorway bounded by side members; an overhead sectional door for closing said doorway; guide means for guiding said door; and sealing means between said door and said doorway side members functioning to seal said door against infiltration of dust and water; in which said sealing means comprises:

a plurality of first elongate, parallel sealing members adapted to effect a seal, when the door is closed, between apposed surface areas of said door and one side member, and another plurality of second elongate, parallel sealing members adapted to effect a seal, when the door is closed, between opposed surface areas of said door and the other side member.

The invention may also comprise one or more further features in which said sealing members in each side comprises an outer compressible sealing member adapted to be compressed between one side member and a front surface of said door, and another of said sealing members comprises an inner compressible sealing member adapted to be compressed between said other side member and a rear surface of said door; in which said sealing members are diametrically opposed to the other and are adjacent to and parallel to the edges of the door; in which said inner compressible members are supported by fixed base members comprising a part of said side members; in which each said fixed base member and the side member comprise a channel, and in which said guide means is disposed within said channel; and in which each outer sealing member is affixed to an outer surface of said door.

The invention may also include one or more further features in which one of said sealing members comprises an outer compressible sealing member adapted to be compressed between one side member and a front surface of said door, and a flexible sealing member attached to said one side member and, when the door is closed, adapted to overlie said compressed outer compressible sealing member and to span the juncture of said one side member and said door and to abut said door in sealing contact.

This aspect of the invention may include one or more further features in which said flexible sealing member is attached to said one side member adjacent the inner edge thereof and angles outward so that, when the door is in closed position and the compressible sealing member compressed, said flexible sealing member stretches out over to said door and provides a second seal; in which said sealing means further comprises an inner compressible sealing member and a fixed base support therefor having mounting means for mounting said inner compressible sealing member thereon, said fixed base support being comprised in said side member and forming therewith a channel, and said mounting means being disposed in a position such that said inner compressible sealing member is compressed between said fixed base support and an inner surface of said door when the door is in closed position; and which further comprises guide means for guiding said door to and from overhead position and in which said channel forms a housing for said guide means.

The invention also relates to improvements in an overhead sectional door characterized by a doorway bounded by side members; an overhead sectional door for closing said doorway; guide means for guiding said door; and sealing means between said door and said doorway side members functioning to seal said door against infiltration of dust and water; in which said sealing means comprises an inner compressible sealing member and a fixed base support therefor having mounting means for mounting said inner compressible sealing member thereon, said mounting means being disposed in a position such that said inner compressible sealing member is compressed between said fixed base support and an inner surface of said door when the door is in closed position.

This aspect of the invention may also include one or more further features comprising an outer compressible seal mounted, when said door is closed, to be compressed between a front surface of said door and an opposed surface of a side member, and in which said fixed base support is comprised in a side member and the two together form a channel for housing said guide means.

The invention also relates to improvements in an overhead door characterized by a doorway bounded by a sill plate and side members; an overhead door for closing said doorway; and sealing means between said door and said doorway side members functioning to seal said door against infiltration of dust and water; and in which said sealing means comprises an upturned lip on the inner edge of said sill plate stretching from one side member to the other and a bottom compressible sealing member positioned to effect a seal between the bottom of said door and said upturned lip.

This aspect of the invention may also comprise one or more features in which said sealing means further comprises an outer compressible sealing member adapted to be compressed between a side member and a front surface of said door; an inner compressible sealing member adapted to be compressed against a rear surface of said door; said sealing members are diametrically opposed one to the other; said inner compressible member is supported by a fixed base member comprised in a side member and forms a channel therewith; and said guide means is disposed within said channel, and which further comprises a flexible sealing member adapted to overlie each outer compressed compressible sealing member and to span from said side member to said door and to abut the latter in sealing contact.

BRIEF DESCRIPTION OF THE DRAWINGS

In the drawings:

FIG. 1 is a fragmentary view in rear elevation of a cap for a pickup according to the invention, mounted on the pickup truck;

FIG. 2 is a cross section taken along line 2—2 of FIG. 1;

FIG. 3 is a cross section taken along line 3—3 of FIG. 1 and FIG. 6;

FIG. 6 is a fragmentary view in rear elevation of a modified form of a cap for a pickup truck according to the invention, mounted on a pickup truck;

FIG. 7 is a cross section taken along line 7—7 of FIG. 6; and

FIG. 8 is a cross section along line 8—8 of FIG. 6.

DESCRIPTION OF THE PREFERRED EMBODIMENTS

Figure 4:
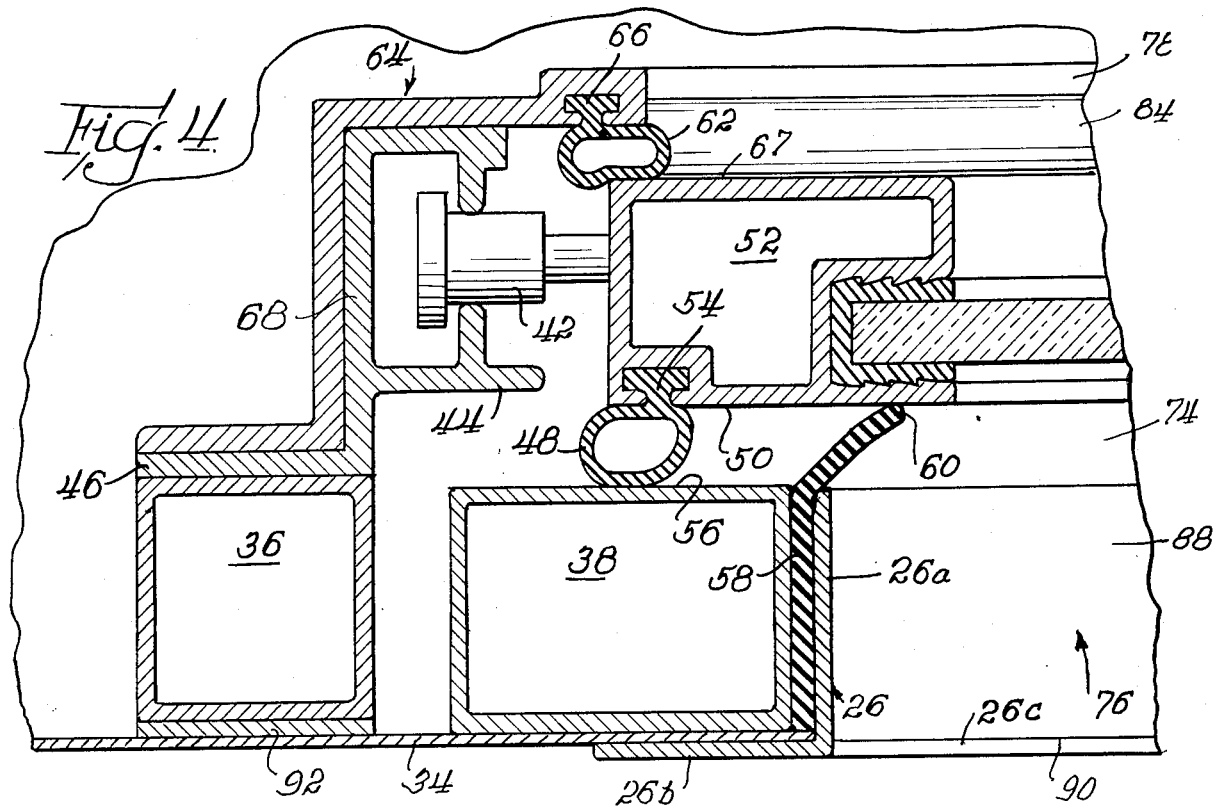
FIG. 4 is a section like FIG. 3 of a modified form.

In FIG. 1, there is illustrated the rear view of a capped pickup in accordance with the invention. 10 is the door frame and 12 is the door. The door frame is shaped to rest on the side walls of the truck body at 14 and to extend down into the tailgate receptor at 16 to the truck bed at 18.

The door opening has a bottom side portion 20 which extends upwardly parallel to the side wall of the truck body coincident with the tailgate receptor 16, and a top section 20a which extends upwardly to the top of the door opening. The side portions 20 and 20a can be aligned vertically, as shown in FIG. 1, or the top portion 20a can be inclined inwardly, as shown in FIG. 6, in which case, it extends parallel to the side 24 of the door frame 10.

Advantageously, suitable molding 26 may be provided around the outer edges of the door frame 10 which abuts the truck body and around the edges of the door frame.

The door is a sectional overhead door composed of panels 28, 30, and 32. The panels 28 and 30, which can be a single panel, if desired, are coincident with the bottom portion 20 of the doorway, whereas the panel 32 is coincident with the upper portion 20a. Thus, the hinge between the panel 30 and 32 is coincident with the top 14 of the truck body.

The door frame 10 is made up of a facing sheet 34 supported by suitable side frame members, such as those illustrated at 36 and 38. The frame member 38 constitutes the basic side frame member of the doorway and the frame member 36 is an auxiliary side frame member which functions as a support for the guide means 42-44. As best seen in FIG. 3, the door 12 is mounted to slide up and down by virtue of the guide rollers 42 mounted to roll in guide frames 44, which are mounted on a bracket 46 which, in turn, is mounted on frame member 36. When the door is in closed position, as guided by the guide means 42-44, a compressible sealing member 48, which is mounted advantageously on the outer side 50 of the door frame section 52 by suitable means such as the T-slot connection 54, it is compressed between inner side 56 of the frame member 38 and the outer side 50 of the door.

If desired, the frame member 36 can slope forward relative to frame member 36, sloping from top to bottom at a slight angle, so that the door 12 gets closer and closer to the frame member 38 as the door approaches the bottom position. Thus, the compressible member 48 is not initially compressed so much and the drag resulting therefrom is minimized.

Further to effect sealing of the door against the entry of dust or water, or both, a flexible sealing member 58 is mounted on the inner side face 59 of the frame member 38 and is clamped between the portion 26a of the molding angle piece 26. The sealing member spans the crack between the door and the side member so that its innermost edge 60 engages the side 50 of the frame member in the closed position and provides further sealing against the entry of dust and water. Both the compressible sealing member 48 and the flexible sealing member 58 extend the full height of the doorway. Similar sealing members are advantageously provided across the top of the doorway.

A further compressible sealing member 62 is mounted on a fixed base support 64 in a suitable T-slot connector 66 so that, in the closed position, it is compressed between the inner surface 67 of the door frame surface 52 and the fixed base support 64. The fixed base support 64 extends along the inner wall 66 of the channel member 44, along the side wall 68 and up against the flange 46 and is affixed thereto in any suitable manner. In the modification of FIG. 1, the sealinbg member and the fixed base support end up from the track bed to the top of the panel 32; in that of FIG. 6, both ordinarily extendup only to the point where the upper part 20a begins to slope in.

The fixed base support 64 and the side frame member 38 constitutes a channel for housing the guide members 42-44. The bottom of this channel is the truck bed and the side walls thereof are impervious to water and dust and the top thereof comes under the protection of the hood portion 70 of the cap. Thus, by the construction shown in FIG. 3, entry of dust and moisture into the cap portion of the pickup truck is greatly minimized and essentially eliminated when a sealing member corresponding to the compressible sealing member 48 and flexible sealing member 58 extend along the top front surface of the top panel 32 and when a corresponding compressible sealing member 72 is provided along the bottom front edge of the bottom frame member of panel 28.

Further effective sealing is obtained by providing a sill plate 74 having depending tubular portions 76 adapted to abut the rear face 82 of the truck bed and an upstanding lip 78 on the forward side of sill plate 74.

Suitable sealing material 80 can be provided if desired between the tubular portion 76 and the rear face 82 of the truck bed. This effectively prevents seepage of moisture up into the truck body proper.

The upturned lip 78 acts as a dam to prevent water from going into the truck body proper. It extends from one side of the truck body to the other so that any water that gets in through the compressible sealing member 72 will be channeled to the sides of the truck body where suitable weep holes, not shown, can be provided.

In a preferred form of the invention, a compressible sealing member 84 effects a seal between the inner surface 67 of the bottom frame member of the panel 28 and the upstanding lip 78. This compressible sealing member can be mounted on the frame member by a suitable T-slot connector 86.

The facing 34 is secured to the frame members, including the frame members 36 and 38, in any suitable manner and extends under the side 26b of the angle piece 26, as shown in FIG. 3, and extends down to the top surface 88 of the tubular portion 76 of the sill plate which constitutes the bottom for the tubular frame members 36 and 38. Suitable weep holes, not shown, can be provided to draw off any water which might be channeled down the tubular frame members 36 and 38.

The front face 90 of the tubular member 76 has a molding strip 26c which has an inturned lip 26d.

While the tubular frame members 36 and 38 have been shown as abutting, it is to be understood that this is not a necessary characteristic and that they can be separated, for example, as shown by the dotted lines in FIG. 3. In a preferred form of the invention in which the top portion 20a of the door frame slopes inwardly, as shown in FIG. 6, the side frame member 38 will be bent correspondingly and, in that case, it will necessarily be separated from the tubular frame member 36 in the region between the top and bottom of panel 32, as shown in FIG. 8. Thus, on the section of FIG. 8, the side frame member 38 will be shifted to the right relative to frame member 36, more or less according to the position of the section line 8—8. The space between the member 36 and 38 in that region becomes progressively greater as the section line 8—8 is moved up toward the top. The axle 42a of the roller at the top will be longer than the corresponding axle on the other rollers and long enough to accommodate the greatest spacing at that point. Otherwise, a special mounting bracket can be used to move the roller out into engagement with the track 44 or the top door frame section can be buttjointed to the side frame section 52 and extended as necessary to make up for the increased space between the frame member 36 and frame member 38 in that position. The tubular frame member 36, desirably, is kept vertical so that channel member 44 of guide means 42-44 need not be bent to conform with the bend in frame member 38. In such case, the fixed base support is not ordinarily used, or mainly extends up to the top of the truck bed, i.e., to the top of the bottom portion 20. If it is desired that the fixed base support in this modification extend all the way up, both it and the guide channel 44 will have to be bent in conformity with the bend of frame member 38.

Thus, in the modification of FIG. 6, the fixed base support 64 extends upwardly only as far as the bottom portion 20, i.e., up to panel 32. That is why it is shown in FIG. 3 but not in FIG. 8. If, however, the channel member 44 is bent to conform with the slope of the upper portion 20a, the fixed base support can be continued up to the top of panel 32 either by bending a single member or by using a two piece construction.

It is sometimes desirable to have the guide means 42-44 slope at a slight angle away from the doorway, as mentioned above. When this is desired, suitable shims 92 may be provided between the frame member 36 and the facing 34. By this construction, the compressible sealing member 48 does not become fully compressed until the door is fully closed.

Figure 5:
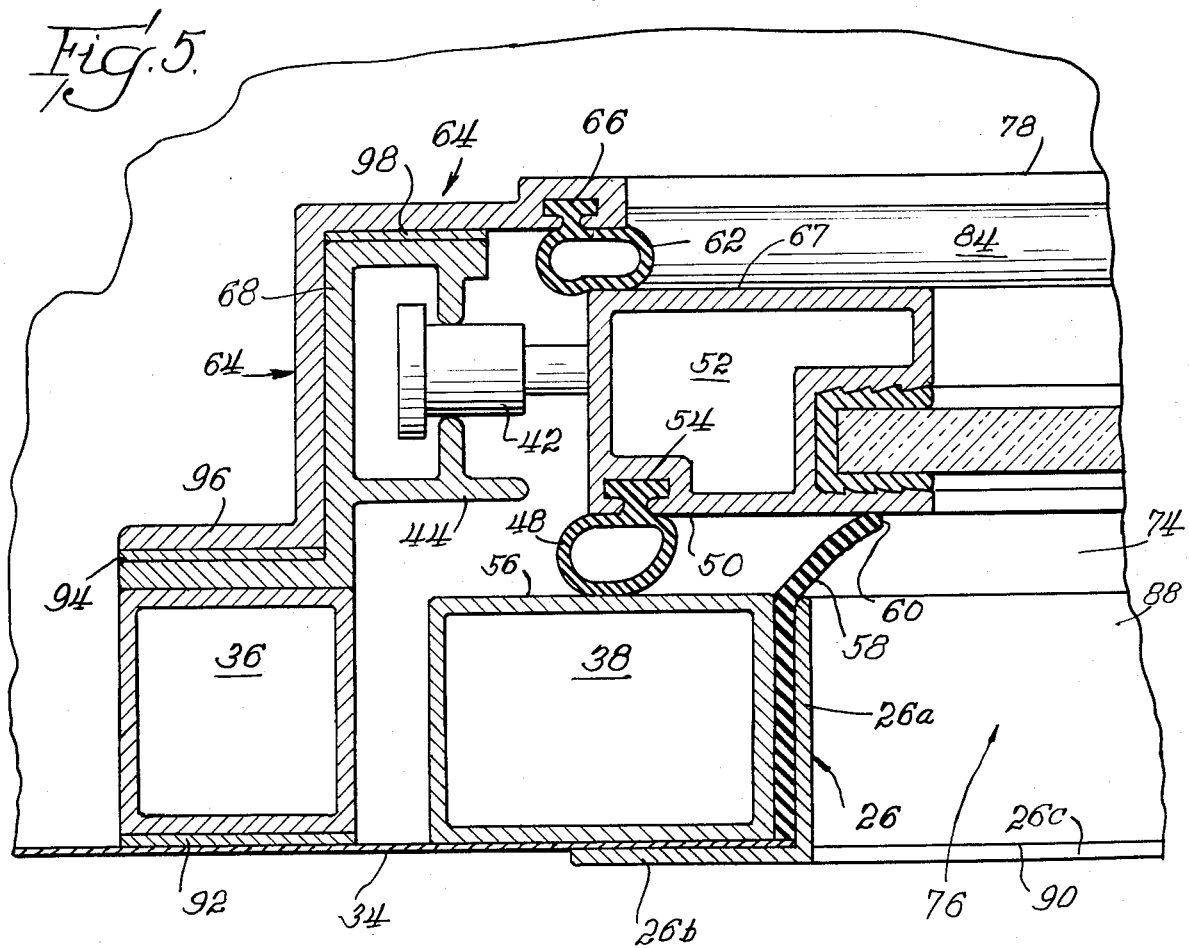
FIG. 5 is a modified form of FIG. 4.

It is sometimes desirable also, as shown in FIG. 5, to provide a shim 94 between the angle piece 96 of the fixed support 64 and the angle piece 46 of the guide means 42-44 and like shims 98 between the guide channel 44 and the apposed portion of the fixed support 64. This further relieves the pressure on the tubular sealing member 62 so that the door is more easily brought to closed position.

The shims 92, 94, and 98 will be of different thicknesses according to the position they occupy relative to the top and bottom of the frame member 36, the ones nearer the top being thicker than the ones near the bottom.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope of the appended claims.

I claim:

1. In an overhead sectional door for a capped pickup truck characterized by a doorway bounded by parallel, vertical side members having interior flat faces disposed in a common plane and extending from the top to the bottom of said doorway; an overhead sectional door for closing said doorway; guide means comprising rollers and guide members for guiding said door from a vertical closed position to a substantially horizontal open position, and vice versa; and sealing means for effecting, only when said door is closed, a seal between said door and said doorway side members functioning to seal said door against infiltration of dust and water;

the improvement in which:
said door has flat faces on its exterior side parallel to and along the entire length of its side edges which, in the closed position, are parallel to and opposed to the flat faces of said side members;

elongate, parallel sealing members affixed to said exterior flat faces of said door adapted to effect a seal, when the door is closed, between opposed faces of said door and each side member;

said rollers are affixed to the door sections at the ends thereof thereby leaving said flat faces on the exterior and interior sides thereof smooth and uninterrupted from the top to the bottom of the door;

the vertical portion of each said guide member is disposed in a channel member comprised of a side member, a fixed base member, and a web connecting the two;

each said guide member has a flat base abutting said web and a flat end portion abutting said fixed base member;

each said base member has an extended portion extending over an interior flat face of said door; and elongate, parallel sealing members affixed to the extended portion of each of said fixed base members adapted to effect a seal, when the door is closed, with the interior flat faces of said door.

2. An overhead door of claim 1, in which said sealing members are
compressible, tubular, sealing members of sufficient diameter to be compressed against the flat surfaces of said door when the door is closed.

3. An overhead door of claim 2, in which said sealing members are diametrically opposed one to the other and are adjacent to and parallel to the edges of the door.

4. An overhead door of claim 2, in which one of said sealing members comprises an outer, tubular, compressible sealing member adapted to be compressed between one side member and a front flat face of said door, and a flexible sealing member attached to said one side member which has a flexible lip which angles toward the center of the doorway and is of such a length that, when the door is closed, it overlies said compressed outer compressible sealing member and spans the gap between said one side member and said door and abuts the exterior flat face of said one side member in sealing contact.

5. In an overhead door for a capped pickup truck characterized by a doorway bounded by the bed of said truck and side members; an overhead sectional door for closing said doorway; and sealing means between said door and said doorway side members functioning to seal said door against infiltration of dust and water;

the improvement which comprises:

a right-angular sill plate having one side which abuts the end of the truck bed and another side which lies flat thereon;

an upturned lip on the inner edge of said sill plate which extends from one side member to the other, and a bottom compressible sealing member positioned to effect a seal at the bottom of said door by the compressible sealing member being pressed into both said upturned lip and the portion of the sill plate from which it is upturned.

6. An overhead door of claim 5, in which said sealing means further comprises an outer compressible sealing member adapted to be compressed between a side member and a front surface of said door; an inner compressible sealing member adapted to be compressed against a rear surface of said door; said outer and inner sealing members are diametrically opposed one to the other; said inner compressible member is supported by a fixed base member comprised in a side member and forming a channel therewith; and said guide means is disposed within said channel.

7. An overhead door of claim 5 which further comprises a flexible sealing member adapted to overlie each outer compressed compressible sealing member and to span from said side member to said door and to abut a flat face of the latter in sealing contact.

* * * * *